(12) United States Patent
Anderson

(10) Patent No.: US 6,451,204 B1
(45) Date of Patent: Sep. 17, 2002

(54) OCEAN POWER PLANT INLET SCREEN

(75) Inventor: J. Hilbert Anderson, York, PA (US)

(73) Assignee: Sea Solar Power, Inc., York, PA (US)

( * ) Notice: Subject to any disclaimer, the term of this patent is extended or adjusted under 35 U.S.C. 154(b) by 0 days.

(21) Appl. No.: 09/832,788

(22) Filed: Apr. 12, 2001

(51) Int. Cl.$^7$ .............................................. B01D 79/03
(52) U.S. Cl. ...................... 210/162; 210/170; 210/499; 405/75; 405/127; 60/641.7
(58) Field of Search ................. 210/159, 162, 210/163, 170, 460, 499; 405/75, 80, 127; 60/641.7

(56) References Cited

U.S. PATENT DOCUMENTS

| | | | |
|---|---|---|---|
| 300,576 A | * 6/1884 | Cole | 405/127 |
| 629,578 A | * 7/1899 | Maginn | 210/170 |
| 1,153,186 A | * 9/1915 | Bates | 210/162 |
| 2,152,619 A | * 3/1939 | Maher | 210/170 |
| 2,288,883 A | * 7/1942 | Bixby | 210/499 |
| 2,361,231 A | * 10/1944 | Nebolsine | 210/170 |
| 3,996,138 A | * 12/1976 | Daidola et al. | 210/170 |
| 4,014,279 A | * 3/1977 | Pearson | 60/641.7 |
| 4,169,792 A | 10/1979 | Dovel | |
| 4,176,984 A | 12/1979 | Sommers | |
| 4,193,503 A | * 3/1980 | Connolly | 210/499 |
| 4,312,288 A | * 1/1982 | Finsterwalder et al. | 60/641.7 |
| 4,415,462 A | 11/1983 | Finch et al. | |
| 4,518,494 A | 5/1985 | Jackson | |
| 4,526,494 A | 7/1985 | Eicher | |
| 4,740,105 A | 4/1988 | Wollander | |
| 5,034,122 A | * 7/1991 | Wiesemann | 210/162 |
| 5,118,414 A | 6/1992 | Byers | |
| 5,215,656 A | 6/1993 | Stoneburner | |
| 5,441,368 A | 8/1995 | Campbell et al. | |
| 5,653,874 A | 8/1997 | Berry, III | |
| 5,788,839 A | 8/1998 | Gargan, Jr. et al. | |
| 5,795,467 A | * 8/1998 | Schloss et al. | 210/162 |
| 6,051,131 A | 4/2000 | Maxson | |
| 6,089,790 A | 7/2000 | Berry, III et al. | |

OTHER PUBLICATIONS

R. T. Richards, Burns & Roe, Inc., "New Ideas for Cylindrical Pipe Intakes Can Help Reduce Fish and Larvae Kills," Power, Jun. 1980, pp. 64–67.

* cited by examiner

*Primary Examiner*—Christopher Upton
(74) *Attorney, Agent, or Firm*—Venable; John P. Shannon; Chad C. Anderson

(57) ABSTRACT

An inlet screen for an ocean thermal power plant has an outer side parallel to the ocean current and a plurality of parallel bars extending at an acute angle to the horizontal, wherein the acute angle opens toward the upstream direction of the current. The total area of through openings in the inlet screen receive the predetermined flow requirement of the power plant at a velocity no greater than 0.5 feet per second, so that fish are not sucked against the screen. The vertical spacing between the bars is no greater than one-half of the inner diameter of tubes in heat exchangers in the plant. The spacing between bars is at a minimum at the outer side of the screen, and the spacing increases between the outer side and the inner side, so that objects do not become wedged between the bars. The inlet screen extends sufficiently below the ocean level to accommodate the plant's water flow requirement at a velocity of no greater than 0.5 feet per second, and extends sufficiently above the ocean level to dissipate the energy of ocean waves as they strike walls of the plant, so that the total form of the waves on the plant is reduced.

15 Claims, 2 Drawing Sheets

OCEAN POWER PLANT INLET SCREEN

BACKGROUND OF THE INVENTION

The present invention relates to inlet screens through which water flows to ocean thermal power plants.

In an ocean thermal power plant, a large quantity of warm water must be injected into the plant from the ocean surface for generating a given amount of power. Typically, for a power plant that generates 100 MW of electricity, the total volume flow of water from close to the surface in the ocean will be on the order of 250 cubic meters per second. This water must flow through a pumping system and a deaeration system before passing through shell and tube heat exchangers in which the tubes have an inside diameter of, for example, about 2 inches. The water flowing into the plant must be screened to keep out fish, jellyfish, and any other floating objects in the sea.

In order to prevent fish from being sucked against a screen, it is generally acceptable practice that, if velocities into the screen are kept as low as 0.5 feet per second or less, then fish will not be sucked against the screen to plug it up. The openings in a screen are sized such that any object large enough to plug the tubes in the heat exchangers should not be allowed to enter through the screen. A typical practice that is considered practical is to limit the size of the openings in the screen to an opening one half the diameter of the bore of each tube. For example, if the bore of each tube is 2.032 inches, then the opening in the screen should not be more than 1.016 inches.

SUMMARY OF THE INVENTION

By the present invention, an ocean power plant inlet screen is provided that has openings sized to keep the velocities of water flowing through the screen below a level that would cause fish to be sucked against the screen to plug it up. The openings in the screen are also sized to keep out all objects that are large enough to plug the tubes in heat exchangers within the ocean thermal power plant. Also in accordance with the present invention, a screen is provided which is as nearly self-cleaning as possible. Furthermore, the structure of the screen assures that all objects too large to pass through the screen are stopped at the outer surface of the screen so that they cannot become wedged in the screen farther into flow passages defined by the screen openings. Moreover, a screen is provided which damps out ocean waves as they strike the screen. As a result, the waves impose less force on the ocean thermal power plant than they would if they struck a blank wall of the power plant.

In order to provide the advantages described above, the inlet screen according to the present invention comprises a plurality of parallel bars extending at an angle to the horizontal. The screen is oriented parallel to the current in the ocean, with the bars angled back in the upstream direction. As a result, the ocean current tends to sweep off any objects that catch on the screen and to send them downward into the ocean. Furthermore, since bars are easily swept free of debris, mechanical cleaning with a rake is facilitated.

The total area of the openings in the screen is sized to keep the velocities of ocean water entering the screen at no greater than 0.5 feet per second, so that fish will not be sucked against the screen to plug it up. Furthermore, the spacing between adjacent parallel bars is made such that the distance between bars in the vertical direction is less than half the inner diameter of the tubes in the heat exchangers. Since the vertical height of most fish is greater than their horizontal width, fish higher than one half the inner diameter of the heat exchange tubes are stopped by the inlet screen.

The width of each bar of the inlet screen is greatest at the outer side of the screen, facing the sea, and the bars taper to a narrower width at the opposite, inner side of the screen. As a result, any objects small enough to enter an opening in the screen will not become caught or wedged between bars farther into the screen. Instead, objects small enough to enter the openings between bars at the outer side of the screen move freely through the rest of the screen.

DETAILED DESCRIPTION OF THE PREFERRED EMBODIMENT

Figure 1:
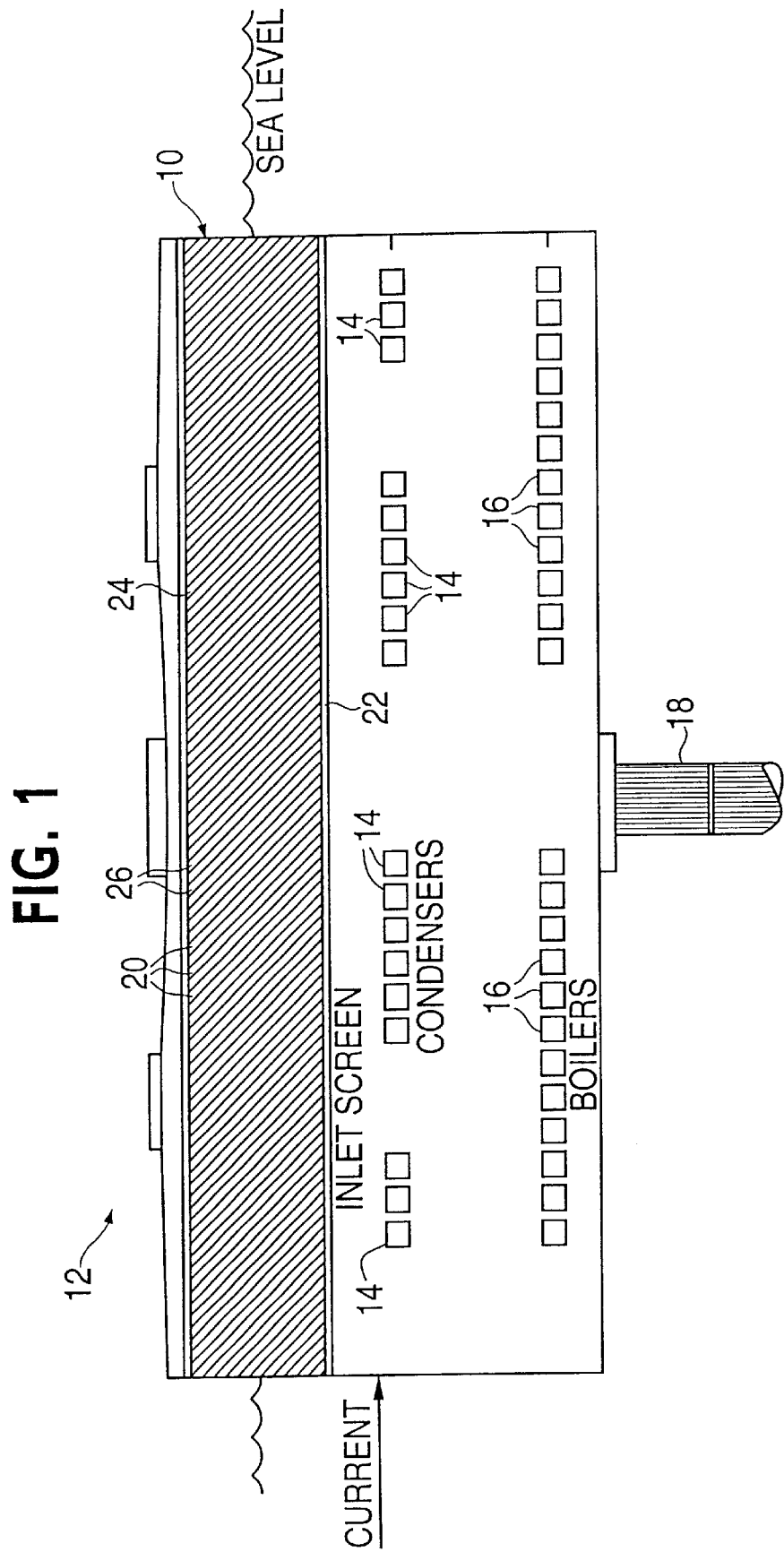
FIG. 1 is a schematic elevation of an ocean thermal power plant employing an inlet screen according to the present invention.

As can be seen from FIG. 1, the inlet screen according to the present invention, which is designated generally by the reference 10, is shown in position on an ocean thermal power plant, which is designated generally by the reference 12. The ocean thermal power plant 12 is constructed to float in the ocean, where it takes advantage of the difference in temperature between water at the surface of the ocean and water deep in the ocean to produce power. The ocean thermal power plant 12 includes a pumping system and a dearation system (not shown), as well as a plurality of condensers 14 and boilers 16, each of which comprises shell and tube heat exchangers. An inlet for water flowing to the boilers is positioned behind the inlet screen 10 so that all of the water entering the tubes of the heat exchangers must pass through the inlet screen 10. A cold water pipe 18 extends from the power plant 12 deep into the ocean.

Figure 2:
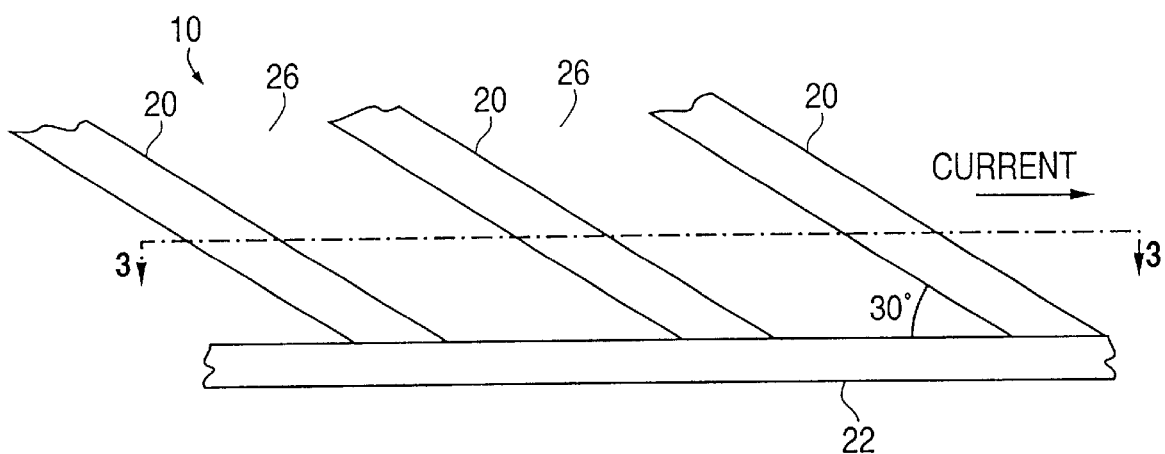
FIG. 2 is an enlarged view of two of the bars of the inlet screen of FIG. 1.
Figure 3:
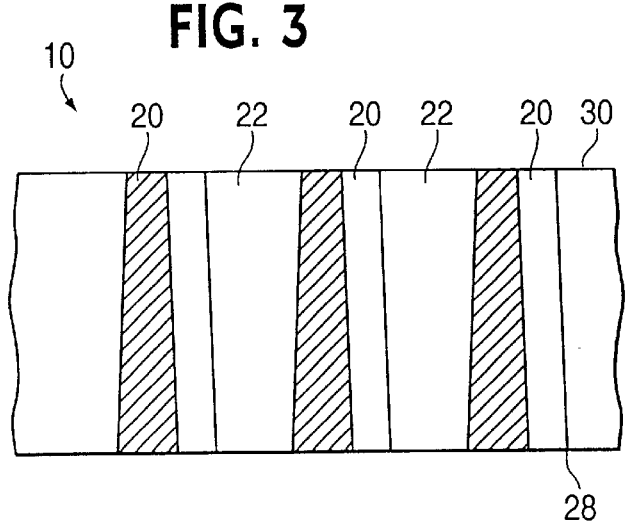
FIG. 3 is a cross section taken along the line 3—3 in FIG. 2.

As can be seen from FIGS. 1 and 2, the inlet screen 10 comprises a plurality of parallel bars 20 extending at an acute angle between a lower horizontal member 22 and an upper horizontal member 24. The entire areas between adjacent bars 20 define through openings 26 extending from an outer side 28 (FIG. 3) of the inlet screen 10, facing the ocean, and an inner side 30. The inlet screen 10 extends below sea level and above sea level, where the inlet screen takes the force of the ocean waves. The alternating bar and through opening structure of the inlet screen 10 breaks up the waves, dissipating the energy. As a result, the waves have less impact than they would have on a blank wall of the power plant 12. Typically, the inlet screen 10 extends about 40 feet above sea level and about 25 feet below sea level.

Oceans have currents, the currents being stronger in some areas than in others. Typical currents always have a velocity of at least 0.5 knots. The power plant 12 and the inlet screen 10 are oriented so that the inlet screen is parallel to the current. Debris stopped at an inlet screen has a tendency to stay at the screen and thereby block some of the inlet area. The parallel bars 20 of the inlet screen 10 according to the present invention provide a mechanism by which debris can be moved easily parallel to the bars 20 without catching on another structure. Furthermore, the bars 20 are angled from the lower horizontal member 22 in a direction upstream relative to the ocean current. As a result, the ocean current sweeps debris forward along the inlet screen 10 and downward into the ocean, thereby rendering the inlet screen 10 self-cleaning. A suitable angle between the bars 20 and the lower horizontal member 22 is 30°.

The ocean thermal power plant 12 has a predetermined flow requirement of water flowing through the inlet screen 10 to the heat exchangers. The through openings 26 have a combined total area that is great enough to receive the predetermined flow requirement of the power plant at a velocity of no greater than 0.5 feet per second. Velocities of no greater than 0.5 feet per second will not cause fish to be sucked up against the through openings 26. Furthermore, since the ocean current is at least 0.5 knots, which is 0.84 feet per second, the ocean current velocity is greater than the influx velocity through the inlet screen 10. This helps assure that debris is swept off the screen by the currents.

The total area needed for all of the through openings 26 can be calculated by dividing the volumetric flow rate of water needed in the power plant 12 by the maximum desired flow velocity through the screen, which here is 0.5 feet per second. Once the total area of through openings 26 is determined, the depth to which the inlet screen 10 must extend into the water can be determined by taking into account the length of the inlet screen, which depends on the dimensions of the power plant 12, and the ratio of the total area of the through openings 26 to the total area of the inlet screen.

It will be apparent to those skilled in the art and it is contemplated that variations and/or changes in the embodiments illustrated and described herein may be made without departure from the present invention. Accordingly, it is intended that the foregoing description is illustrative only, not limiting, and that the true spirit and scope of the present invention will be determined by the appended claims.

I claim:

1. An inlet screen for a facility receiving water from a body of water having a current, comprising:

a plurality of parallel bars extending at an acute angle to the horizontal, the inlet screen having an outer side facing the body of water and an opposite, inner side, the outer side being oriented generally parallel to the current, through openings between the parallel bars, the through openings extending from the outer side of the screen to the inner side and extending across substantially the entire area between the bars, wherein the acute angle opens toward the upstream direction of the current, whereby the current sweeps away objects at the outer side of the inlet screen.

2. The inlet screen of claim 1, wherein the acute angle is approximately 30°.

3. The inlet screen of claim 1, wherein the spacing between the bars has a first magnitude at the outer side of the inlet screen, wherein said bars each have a width, the bars tapering in width between the outer side of the screen and the inner side of the screen, and wherein said first magnitude is the smallest magnitude of the spacing between the bars, whereby objects entering the inlet screen between the bars do not become wedged between the bars between the inner and outer sides of the inlet screen.

4. An ocean thermal power plant in an ocean having a current, comprising:

an inlet for receiving water from the ocean;

heat exchangers having tubes receiving water from said inlet; and an inlet screen screening said inlet, said inlet screen comprising a plurality of parallel bars extending at an acute angle to the horizontal, the inlet screen having an outer side facing the ocean and an opposite, inner side, the outer side being oriented generally parallel to the current; and through openings between the parallel bars, the through openings extending from the outer side of the screen to the inner side and extending across substantially the entire area between the bars, wherein the acute angle opens toward the upstream direction of the current, whereby the current sweeps away objects at the outer side of the inlet screen.

5. The ocean thermal power plant of claim 4, wherein the ocean thermal power plant has a predetermined flow requirement for water flowing through the inlet screen, wherein the through openings have a combined total area, and wherein the total area is great enough to receive the predetermined flow requirement of the power plant at a velocity of no greater than 0.5 feet per second.

6. The ocean thermal power plant of claim 4, wherein the acute angle is approximately 30°.

7. The ocean thermal power plant of claim 4, wherein the vertical spacing between the bars is no greater than one-half of the inner diameter of the tubes.

8. The ocean thermal power plant of claim 4, wherein, said bars each have a width, the bars tapering in width between the outer side of the screen and the inner side of the screen.

9. The ocean thermal power plant of claim 4, wherein the inlet screen extends upward on the order of 40 feet above sea level.

10. The ocean thermal power plant of claim 4, wherein the through openings have a combined total area, wherein the total area is great enough to receive the predetermined flow requirement of the power plant at a velocity of no greater than 0.5 feet per second, and wherein the ocean current velocity is greater than the influx velocity through the screen.

11. An inlet screen in combination with a facility receiving water from a body of water having a current, the inlet screen comprising:

a plurality of parallel bars extending at an acute angle to the horizontal, the inlet screen having an outer side facing the body of water and an opposite, inner side, the outer side being oriented generally parallel to the current, through openings between the parallel bars, the through openings extending from the outer side of the screen to the inner side and extending across substantially the entire area between the bars, wherein the acute angle opens toward the upstream direction of the current, whereby the current sweeps away objects at the outer side of the inlet screen.

12. The inlet screen and facility combination of claim 11, wherein the facility has a predetermined flow requirement for water flowing through the inlet screen, wherein the through openings have a combined total area, and wherein the total area is great enough to receive the predetermined flow requirement of the facility at a velocity of no greater than 0.5 feet per second.

13. The inlet screen and facility combination of claim 11, wherein the acute angle is approximately 30°.

14. The inlet screen and facility combination of claim 11, wherein the facility has tubes through which flows the water passing through the inlet screen, and wherein the vertical spacing between the bars is no greater than one-half of the inner diameter of the tubes.

15. The inlet screen and facility combination of claim 11, wherein the spacing between the bars has a first magnitude at the outer side of the inlet screen, wherein said bars each have a width, the bars tapering in width between the outer side of the screen and the inner side of the screen, and wherein said first magnitude is the smallest magnitude of the spacing between the bars, whereby objects entering the inlet screen between the bars do not become wedged between the bars between the inner and outer sides of the inlet screen.

* * * * *